US009316025B2

(12) United States Patent
Lien

(10) Patent No.: US 9,316,025 B2
(45) Date of Patent: Apr. 19, 2016

(54) ACTUATING MOTOR SET OF ELECTRONIC LOCK

(71) Applicant: WFE TECHNOLOGY CORP., Taichung (TW)

(72) Inventor: Jack Lien, Taichung (TW)

(73) Assignee: WFE TECHNOLOGY CORP., Taichung (TW)

( * ) Notice: Subject to any disclaimer, the term of this patent is extended or adjusted under 35 U.S.C. 154(b) by 478 days.

(21) Appl. No.: 13/893,974

(22) Filed: May 14, 2013

(65) Prior Publication Data

US 2013/0305792 A1 Nov. 21, 2013

(30) Foreign Application Priority Data

May 15, 2012 (TW) ............................ 101117235 A

(51) Int. Cl.

| | |
|---|---|
| ***F16H 25/00*** | (2006.01) |
| ***E05B 47/00*** | (2006.01) |
| ***E05B 47/06*** | (2006.01) |
| *E05B 15/04* | (2006.01) |

(52) U.S. Cl.

CPC ......... *E05B 47/0012* (2013.01); *E05B 47/0615* (2013.01); *E05B 47/0642* (2013.01); *E05B 2015/0424* (2013.01); *E05B 2047/0023* (2013.01); *E05B 2047/0031* (2013.01); *Y10T 70/7102* (2015.04)

(58) Field of Classification Search

CPC ........... Y10T 70/7102; E05B 47/0012; E05B 47/0615; E05B 47/0642; E05B 2015/0424; E05B 2047/0023; E05B 2047/0031

See application file for complete search history.

(56) References Cited

U.S. PATENT DOCUMENTS

2010/0300163 A1* 12/2010 Loughlin ................ E05B 37/08 70/301
2011/0291428 A1* 12/2011 Milton-Benoit .... E05B 47/0692 292/228
2013/0161149 A1* 6/2013 Hazama .................. B60T 1/005 192/220.2
2014/0069155 A1* 3/2014 Laval .................. B60R 25/0215 70/183
2015/0061301 A1* 3/2015 Torka ...................... E05B 77/36 292/194
2015/0233157 A1* 8/2015 Bendel .................. E05B 85/243 292/199

* cited by examiner

*Primary Examiner* — David M Fenstermacher

(74) *Attorney, Agent, or Firm* — Muncy, Geissler, Olds & Lowe PC

(57) ABSTRACT

An actuating motor set includes a mounting base; a motor; a transmission set including a worm gear formed with a tooth, wherein two opposite ends of the worm gear respectively defining are a pushing end and a restoring end; and a spring including an engagement part and an abutment part. The engagement part is engaged with the tooth, and an inner diameter of the abutment part is larger than an outer diameter of the tooth. The spring is pushed spirally by the tooth upon rotation of worm gear, and thus moving back and forth on an axial direction of the worm gear. The spring idles when it is moved to the pushing end due to lack of engagement therewith, and the spring also idles when it is moved the restoring end due to lack of engagement therewith.

19 Claims, 13 Drawing Sheets

ACTUATING MOTOR SET OF ELECTRONIC LOCK

CROSS-REFERENCES TO RELATED APPLICATIONS

This application claims the priority of Taiwanese Patent application No. 101117235 filed on May 15, 2012, which is incorporated herewith by reference.

BACKGROUND OF THE INVENTION

1. Field of the Invention

The present invention relates to an actuating motor set, and especially to an actuating motor set installed in an electronic lock.

2. The Prior Arts

For the anti-theft purpose, a conventional mechanical lock is configured with a lock core and lock bolt, so each lock can only be opened with a dedicated key. However, this kind of locks can be unlocked with special mechanical tools easily. In order to further increase the difficulty of unlocking, it is known to combine the conventional mechanical locks with the electronic sensor identification mechanism to achieve a better anti-theft effect.

FIG. 1 shows the structure of a conventional electronic lock to include a lock core 20 connected with a clutch 30; a cam 40; an actuating motor set 50 and a turning core 60. The components listed above are installed in a casing 70, and then the casing is connected to the turning knob 80 with an end of the turning core 60. When a correct key 10 is inserted to the lock core 20, the key 10 can go through the key groove and push against the front clutch member 31 backwards. In the meanwhile, the chip on the key 10 can send a pass code/data stored within to the electronic lock control system for identification through electronic contact sensing. If the identification result matches, the electronic lock then activates the actuating motor set 50 to drive and push the corresponding components, so the rear clutch member 33 is pushed forward, and the connecting groove 331 of the rear clutch member 33 is connected with the front clutch member 31. At this moment, the key 10 can be turned, and the transmitting member 32 pivotally rotates a cam 40 to unlock the lock.

The purpose of the actuating motor set is to prepare the lock for its pre-unlocking state. If the actuating motor is malfunctioned, the electronic lock cannot be unlocked even if the key matches with the lock itself mechanically and electronically. Therefore, the actuating motor set 50 plays a considerably important role in the electronic actuating mechanism of the electronic locks. In other words, the actuating method and the malfunction rate of the actuating motor set 50 can deeply affect the usage life and the effect of electronic locks. The conventional actuating motor set does not include a position limiting mechanism to limit the components connected, therefore, when the components moves forward or backward with the drive of the motor, they usually overshoot and end up pushing other components. The above-described condition not only affect the usage life of the motor, but also results in a high malfunction rate due to the displacements or poor contact caused by the pushed components. Those who skilled in the art have developed improved actuating motor sets with position limiting sensor and position limiting mechanism, however, the components are still too complicated which results in a complicated manufacturing process. In addition, the production cost is also high due to the number of parts and electronic components utilized, thereby lowering the competitiveness of the product.

SUMMARY OF THE INVENTION

The primary purpose of the present invention is to provide an actuating motor set with a simplified position limiting driving component. With the actuating method of a spring and a worm gear, the actuating motor of the present invention can drive components more precisely, prevent overshoot, prolong the usage life of the motor, lower the malfunction rate of the electronic lock, simplify the manufacturing process and also decrease the production costs.

The actuating motor set of electronic lock of the present invention includes the following components: a mounting base including a chamber; a motor connected to the mounting base and having a rotating shaft; a transmission set including a worm gear. The worm gear is connected to the rotating shaft, and a tooth distributed not all the way to two opposite ends of the worm gear. The two ends respectively defining a pushing end and a restoring end; and a spring including an engagement part and an abutment part. The engagement part is engaged with the tooth, and a remaining part of the spring defines the abutment part. An inner diameter of the abutment part is larger than an outer diameter of the tooth. The spring is pushed spirally by the tooth upon rotation of worm gear, and thus moves back and forth on the axial direction of the worm gear. The spring idles when it is moved to the pushing end due to lack of engagement therewith, and the spring also idles when it is moved the restoring end due to lack of engagement therewith. In the above configuration, the abutment part further abuts against a rear clutch member, where the rear clutch member has a sliding groove for connecting within the chamber. The chamber includes a corresponding rib, so the rear clutch member can slide within the chamber.

In one embodiment of the present invention, the engagement part is an open spiral structure, and is engaged to the worm gear by setting the inner diameter of the spiral structure of the engagement part to be smaller than the outer diameter of the tooth. In another embodiment of the present invention, the engagement part is bent toward the worm gear to form a horizontal hook to be engaged with the tooth, where the position of the engagement is also smaller than the outer diameter of the tooth.

With the above described configuration of worm gear and spring, the worm gear rotates together with the actuating motor, and the engagement part of the spring engaging with the tooth is pushed toward the rear clutch member during the rotation, so the rear clutch member which is abutted against by the spring is pushed outward gradually. However, when the engagement part of the spring is pushed to the pushing end, the spring is not pushed further forward since there is no tooth at the pushing end to push the spring. The spring is then hold at certain position by the rotating tooth when it falls back, thereby limiting the position of the spring at the pushing end and preventing overshoot situation. Similarly, when the worm gear rotates in the opposite direction, the engagement part of the spring is pulled toward the motor side by the engaged tooth. When the engagement part of the spring is moved to the restoring end, the spring also idles and is not pushed forward towards the motor since there is no tooth at the restoring end to push the spring. The spring is also hold at certain position by the rotating tooth when it falls back, thereby achieving the position limiting of the spring. Therefore, the present invention can achieve the goal of providing driving force and position limiting with simplest components, thereby preventing the overshoot situation by the driving of the motor. In addition, because the spring is moved back and forth on the axial direction of the worm gear, additional rooms for installing other components are not required, and the size of the product can be reduced. The manufacturing process can be simplified and the production cost can also be lowered, thereby enhancing the competitiveness of the product.

Furthermore, in order to increase the torque and the positioning precision while coupling the rear clutch member and the cam, a new rear clutch member structure is provided by the actuating motor set of electronic lock of the present invention. The rear clutch member includes: a base, two positioning sliders and a second extending tube. The base includes two through holes and two restricting portions, wherein a buffer space is formed between two restricting portions. A resilient member is connected between the two positioning sliders. The two positioning sliders, each formed with a positioning portion on the outer periphery thereof, are fitted in the buffer space such that the two positioning sliders can slide toward or away from each other via the resilience of the resilient member in the buffer space. The second extending tube abuts against the abutment part, where a clutch block is connected to the other end of the second extending tube opposite from the abutment part. The clutch block includes at least one latching protrusion which abuts the second extending tube at the abutment part, and protrudes from the respective through hole. The cam includes two positioning grooves for coupling with the positioning portion of the positioning slider, and includes at least one latching groove for latching with the at least one latching protrusion.

In the initial state, the two positioning sliders of the rear clutch member are pushed away from each other by the resilience of the resilient member in such way that each of positioning slider is abutted and coupled to the positioning groove. While the base is being rotated, the two positioning sliders are gradually pushed inward and toward each other after the positioning sliders are abutted by the positioning groove. The resilience of the resilient member serves as the buffer for such movement and then further disengages the coupling between the two positioning sliders and the positioning groove. In this way, the rotation of the base does not rotate the cam. However, when the motor is activated and the abutment part of the spring is moved, the second extending tube is also abutted to move toward the base. Meanwhile, the latching protrusion connected to the second extending tube then protrudes outward from the through hole on the base to further latch with the latching groove of the cam. Under this state, the lock can be opened via the rotation of the cam by the rotation of the base.

DETAILED DESCRIPTION OF THE PREFERRED EMBODIMENTS

The present invention will be apparent to those skilled in the art by reading the following detailed description of preferred embodiments thereof, with reference to the attached drawings.

Figure 1:
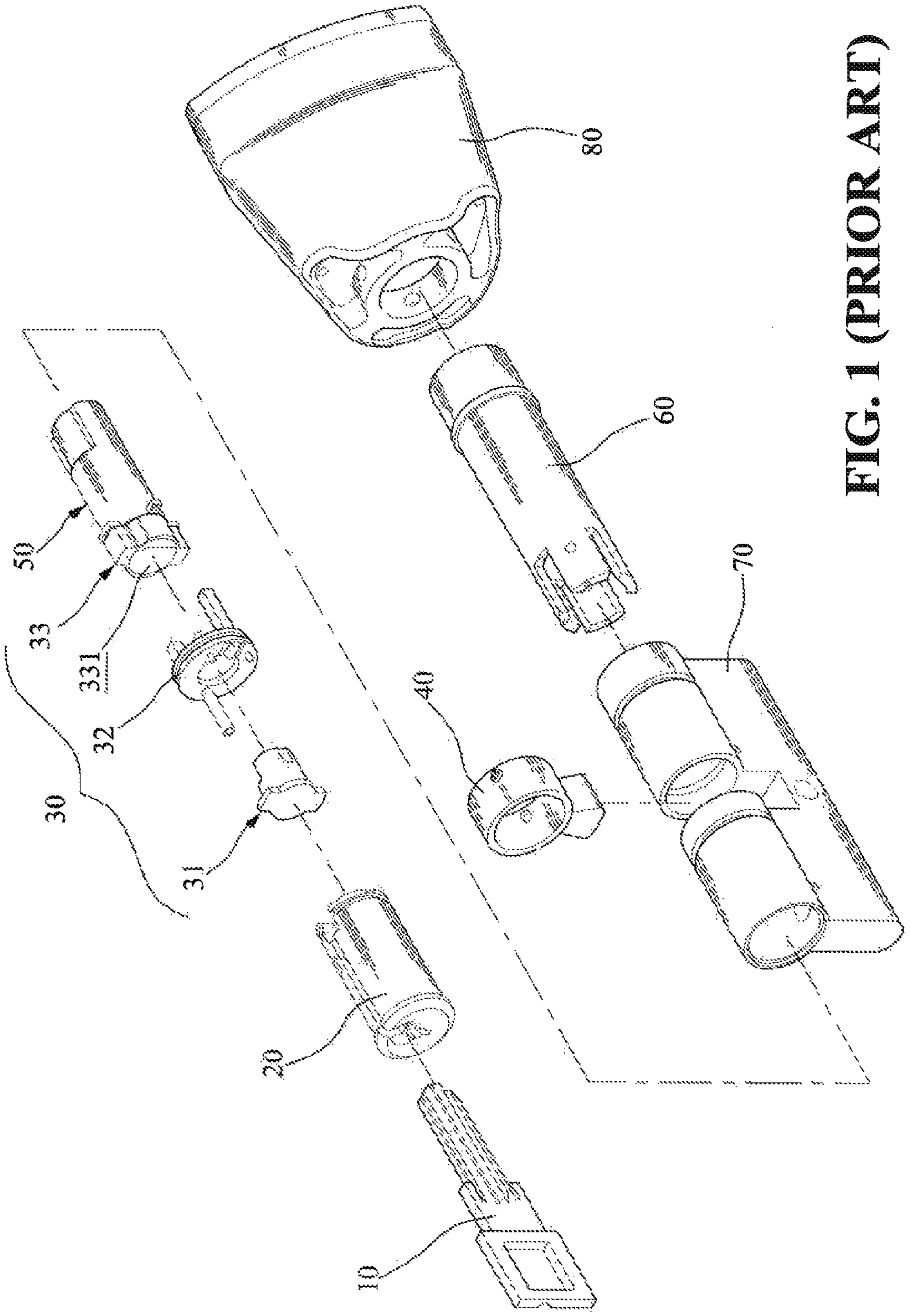
FIG. 1 (PRIOR ART)
FIG. 1 is a exploded view showing a conventional electronic lock.
Figure 2:
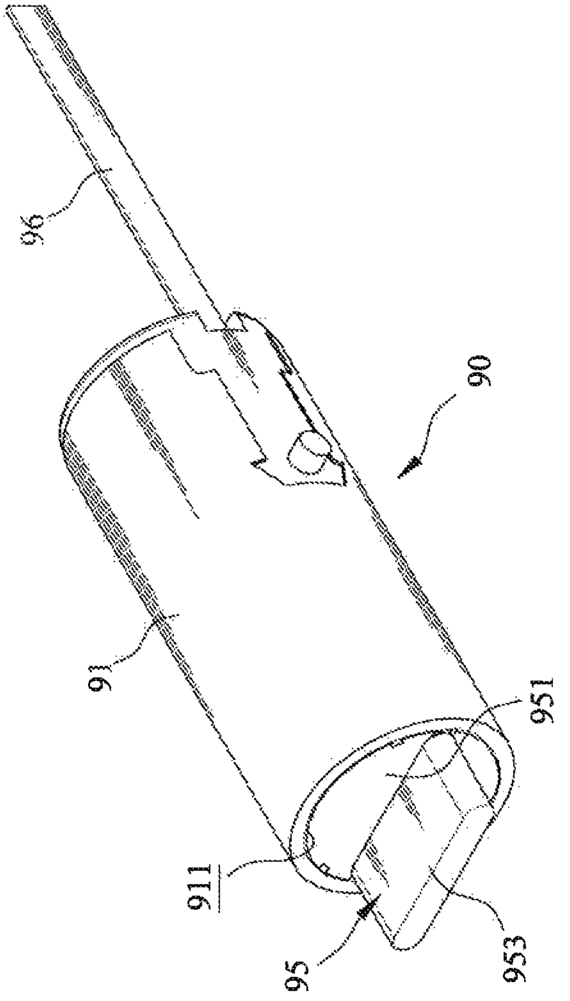
FIG. 2 is a schematic view showing the first embodiment of an actuating motor set of the present invention for an electronic lock.
Figure 3:
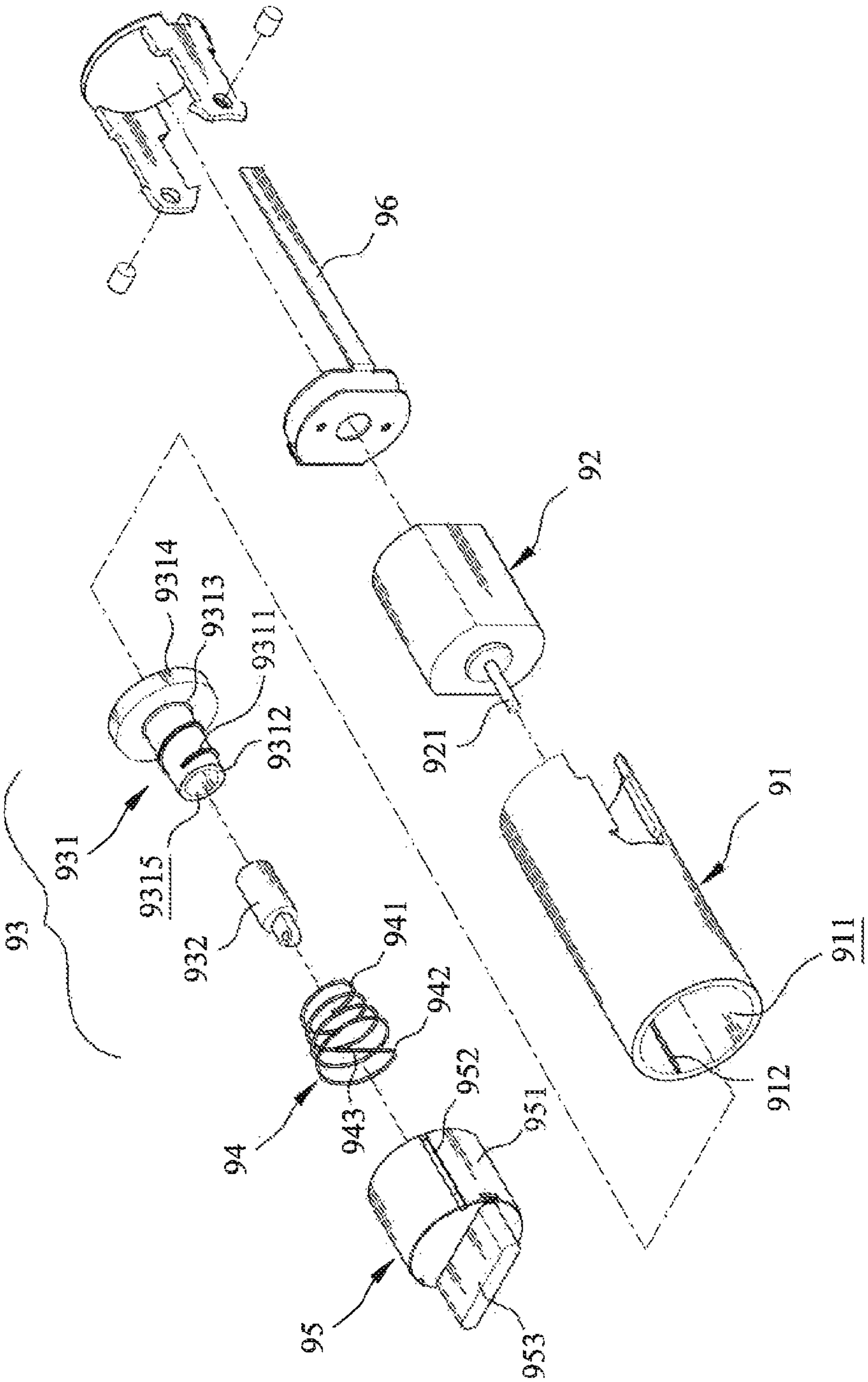
FIG. 3 is a perspective exploded view showing the first embodiment of the actuating motor set of the present invention.
Figure 4:
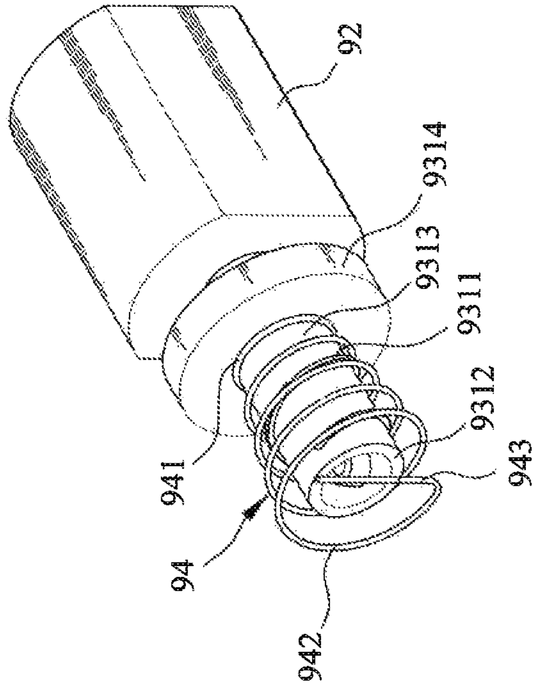
FIG. 4 is a partial assembly view showing the first embodiment of the actuating motor set of the present invention.

FIG. 2 is schematic view showing the appearance of the first embodiment of the actuating motor set of the present invention, FIG. 3 is a perspective exploded view and FIG. 4 is an assembly view showing the first embodiment of the actuating motor set the present invention. As shown in FIG. 2-4, the actuating motor set 90 of an electronic lock includes a spring 94 which is abutted against a rear clutch member 95. The rear clutch member 95 is installed in the mounting base 91 and is slidable within a chamber 911 of the mounting base 91. When the transmission set 93 pushes the spring 94, the rear clutch member 95 also slides outward from the chamber 911 and connects with the front clutch member 31 (as shown in FIG. 1), thereby unlocking the electronic lock.

As shown in FIG. 2-4, the actuating motor set 90 of the first embodiment of the actuating motor set of the present invention includes the following components: a mounting base 91, a motor 92, a transmission set 93 and a spring 94. The configuration of the mounting base 91 is not limited by the present invention specifically; it can be an integrally formed body as the present embodiment, an assembly of an upper and lower piece or can be in any other forms. The mounting base 91 is formed with a chamber 911, where the motor 92, transmission set 93 and spring 94 are installed, and the first extending tube 951 of the rear clutch member slides within. The shape of the first extending tube 951 should correspond to the shape of the chamber 911, so the first extending tube 951 can slide within the chamber 911. The shapes of the two are not limited. In order to ensure the first extending tube 951 slides in a certain direction, a sliding groove 952 can be formed on the outer peripheral of the first extending tube 951, and a corresponding rib 912 can be formed in the chamber 911. The sliding mechanism of the rear clutch member 95 and the chamber 911 is not limited to this embodiment, for example, the location of the rib and the sliding groove can be altered, or one can utilize rear clutch member 95 and chamber 911 with non-circular shape to limit the direction of sliding. The first extending tube 951 also has an engaging piece 953. The shape of the engaging piece 953 is also not specifically limited and can be adjusted according to the need of front clutch member or the shape of other corresponding components.

The motor 92 is axially connected to a transmission set 93. The transmission set 93 includes a worm gear 931, which is axially connected to the rotating shaft 921. The worm gear 931 can be disposed on the rotating shaft 921 directly, or can also be connected in the configuration of the current embodiment. In the current embodiment, a connecting groove 9315 is formed first on the worm gear 921, and the rotating shaft 921 is axially connected to a connecting member 932, which is disposed in the connecting groove 9315. The worm gear 931 is connected to the rotating shaft 921 coaxially or eccentrically. A bearing (not visible) is further installed on the rotating shaft 921 between the connecting member 932 and the motor 92. When the spring 94 abuts and pushes the rear clutch member 95, it generates a pushing force in the opposite direction against the worm gear 931. The bearing serves as a cushion to reduce the pushing force, thereby reducing the rotation resistance generated in the worm gear 931 and prolonging the usage life of the transmission set 93. A tooth 9311 is formed on the worm gear 931, but the tooth does not extend to the pushing end 9312 and the restoring end 9313. The restoring end 9313 can further connects to a base 9314, which is used to abut against the pushing force of spring 94 when the spring 94 restores to its initial position.

The spring 94 includes an engagement part 941 and an abutment part 942, locating on two opposite ends of the spring 94. In the first embodiment, the engagement part 941 has an open spiral structure, and is engaged with the tooth 9311 via spirally engagement method. Therefore, the inner diameter of the engagement part 941 is smaller than the outer diameter of the tooth 9311, so it can be engaged with the tooth 9311. When the tooth 9311 rotates spirally, the engagement part 941 also rotates spirally and the spring 94 is moved forward along with the rotation. In the first embodiment, the inner diameter of the abutment part 942 is larger than the outer diameter of the tooth 9311, thus forming a spiral structure where its diameter increases gradually from the engagement part 941 to the abutment part 942. Besides from having an inner diameter larger than the outer diameter of the tooth 9311, the size of the abutment part 942 is not otherwise limited, but its outer diameter should be smaller than the capacity of the first extending tube 951. The direction of the spiral structure of the spring 94 can be either clockwise or counter-clockwise, depending on the direction of the spiral tooth 9311 of the worm gear 931. The spiral direction of the spring 94 and the tooth 9311 has to be in the same direction. The end of the abutment part 942 can be directly connected to the first extending tube 951, and can be further bent to form a fixing part 943, which can be engaged and fixed with the first extending tube 951. The shape of the fixing part 943 is not limited by the present embodiment; it can be a linear shape, arc shape or a circular shape.

When assembling the present invention, first, the transmission set 93 is axially connected to the motor 92. The spring 94 is inserted and installed on the worm gear 931 next, and the rear clutch member 95 is installed to enclose the spring 94. Then, the above components are installed into the chamber 911 of the mounting base 91. The motor 92 is electrically connected to a circuit 96 in order to power up the motor after the sensing results matches.

Figure 5:
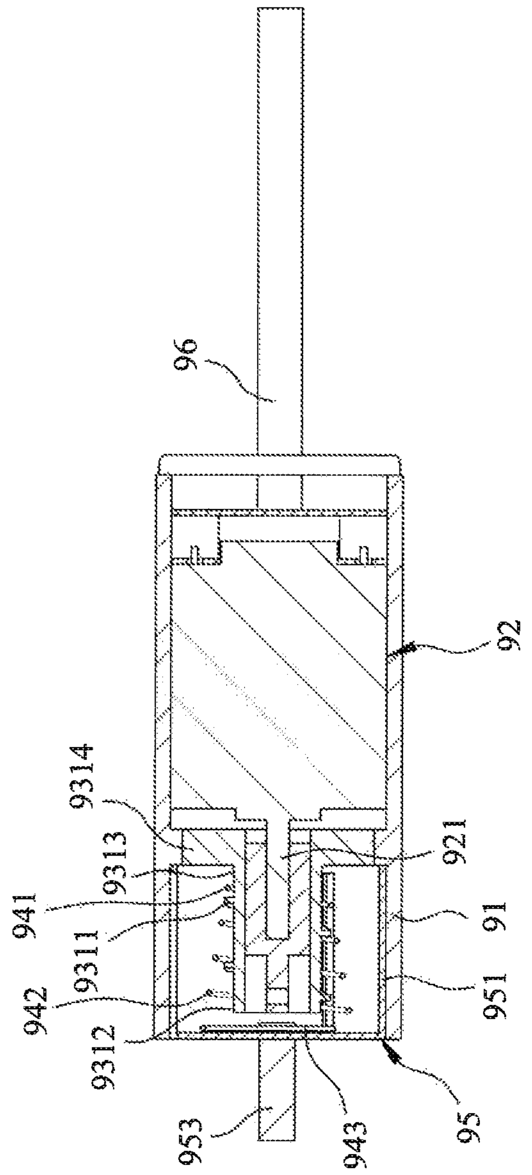
FIG. 5 is a side section view showing the first embodiment of the actuating motor set of the present invention.
Figure 6:
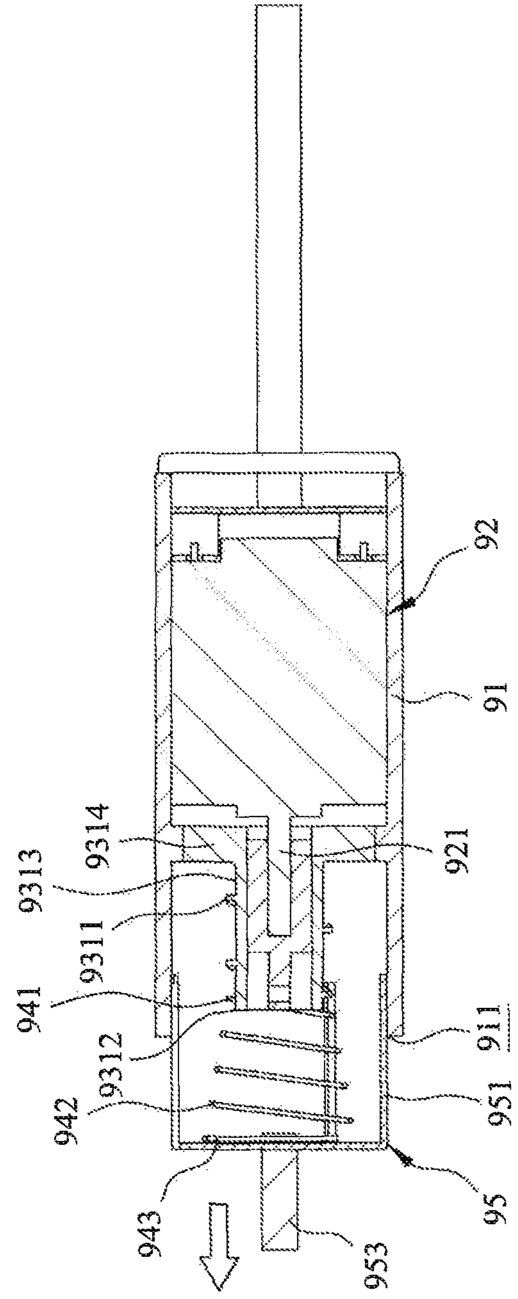
FIG. 6 is a schematic view showing the actuation of the first embodiment of the actuating motor set of the present invention.

FIG. 5 and FIG. 6 are the schematic view showing the actuation of the first embodiment of the actuating motor set of the present invention. As shown in FIG. 5, when the motor 92 is not activated, the engagement part 941 of the spring 94 is at the restoring end 9313 of the worm gear 931. In the present embodiment, the radius of the spring 94 increases gradually from the engagement part 941 to the abutment part 942; thus, in the initial state, only partial of the inner peripheral of the engagement part 941 is engaged with the spiral structure of the tooth 9311. The first extending tube 951 of the rear clutch member 95 is in the chamber 911 of the mounting base 91 before the motor 92 activates the transmission set and the spring 94. Once the motor 92 is activated, the worm gear 931 starts to rotate, and the tooth 9311 also rotates spirally together with the worm gear 931. In the meantime, the engagement part 941, engaging with the tooth 9311, is moved gradually toward the pushing end 9312 of the worm gear 931 along the tooth 9311 by the spiral rotation of the tooth 9311. The spring 94 then pushes back against the first extending tube 951 of the rear clutch member 95, causing the rear clutch member 95 to move outward from the chamber 911. When the engagement part 941 gradually moves toward the pushing end 9312, the rear clutch member 95 is also gradually pushed to its designated position. At this moment, although the spring 94 will continue to push for a small period of time, but the elasticity of the spring 94 can prevent it from over pushing. When the engagement part 941 is moved to the pushing end 9312, the engagement part 941 is not pushed by the tooth 9311 anymore and the spring 94 idles due to lack of engagement therewith (because there is no tooth 9311 formed at the pushing end 9312). In addition, the elastic force in the reverse direction generated by the spring 94 pushing the rear clutch member 95 does not cause the spring 94 to move toward the restoring end 9313, because the engagement part 941 is still being spirally pushed by the tooth 9311, and thereby achieving the purpose of limiting the position of rear clutch member 95. Therefore, the length of the tooth 9311 and the spring 94 can be adjusted according to the length of the corresponding rear clutch member 95 displacement and driving force needed to precisely limit the position of the rear clutch member 95. According to the actuation mechanism provided by the embodiment of present invention described above, the position of the components can be precisely limited, and the overshoot situation can be prevented since there is no exceeding power output. Furthermore, the motor life can also be prolonged since there is no resistance during the rotation of the motor.

On the other hand, when the rear clutch member 95 needs to restore to its initial position, motor 92 starts to rotate in the opposite direction. The engagement part 941 engaged with the tooth 9311 is then pushed in the opposite direction toward the restoring end 9313 along with the spiral rotation of the tooth 9311. While returning to the restoring position, the fixing part 943 of the spring 94 pulls the rear clutch member 95 from the first extending tube 951, so the rear clutch member 95 gradually slides into the chamber 911 and disengage with the front clutch member (not shown). Similarly, the engagement part 941 is also not pushed by the tooth 9311 and idles when the engagement part 941 moves close to the restoring end 9313 since there is no tooth 9311 formed at the restoring end 9313. In addition, a base 9314 is further formed at the restoring end 9313 of the worm gear 931 to prevent the spring 94 from directly pushing the motor 92. The shape of the base 9314 is not limited by the present invention in any way as long as the base 9314 can block the engagement part 941. Furthermore, the spring 94 in the present invention only moves back and forth in the axial direction of the worm gear 931, thus additional rooms and components are not required while assembling the motor set, thereby reducing the size of the product and lowering the production cost.

Figure 7:
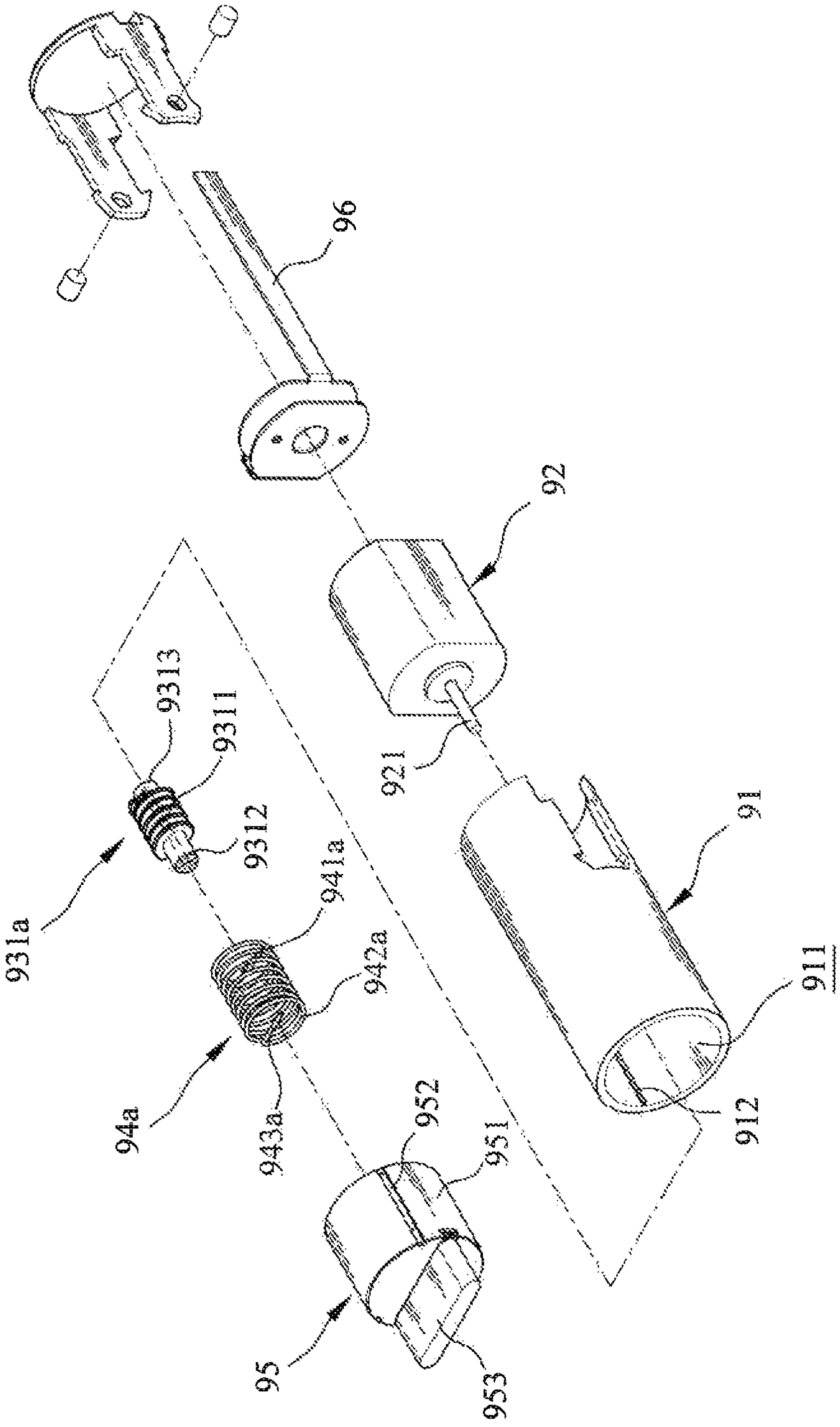
FIG. 7 is an exploded view showing the second embodiment of the actuating motor set of the present invention.
Figure 8:
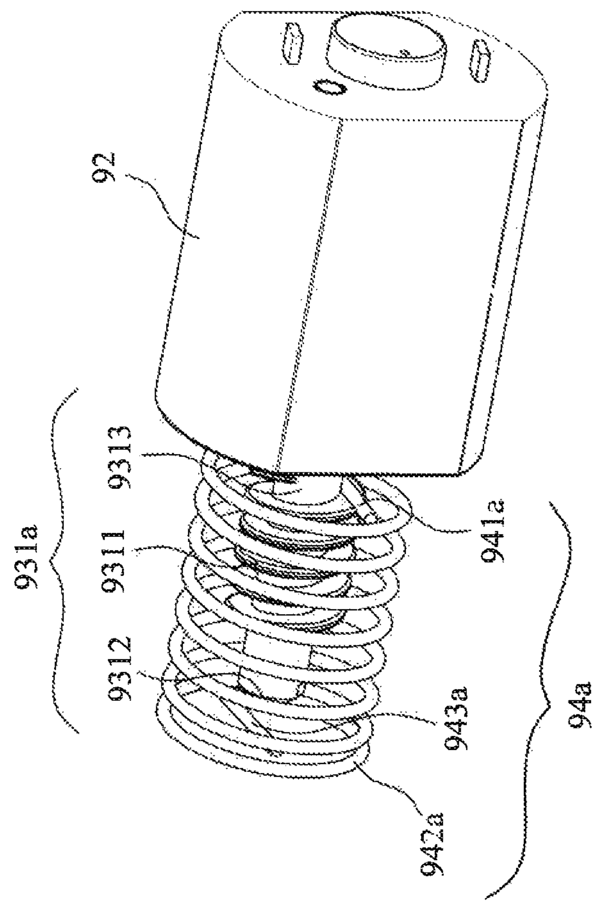
FIG. 8 is a partial assembly view showing the second embodiment of the actuating motor set of the present invention.
Figure 9:
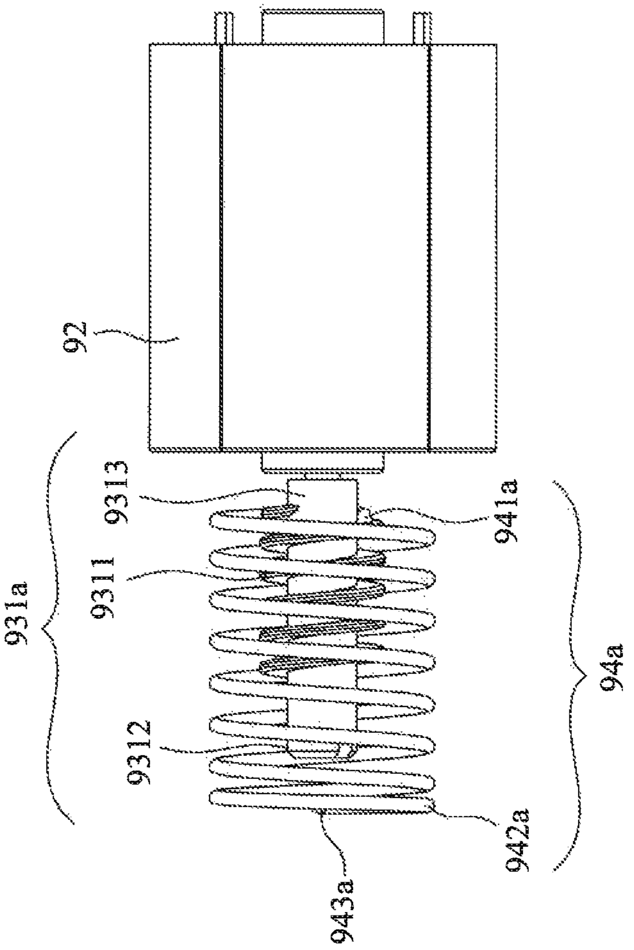
FIG. 9 is a partial side view showing the second embodiment of the actuating motor set of the present invention.

Please refer to FIG. 7, FIG. 8 and FIG. 9. FIG. 7 is a perspective and exploded view showing the second embodiment of the present invention. FIG. 8 and FIG. 9 are perspective views showing a partial assembly of second embodiment of the present invention. In the second embodiment, the actuating motor set 90 of electronic lock includes a mounting base 91, a motor 92, a transmission set 93 and a spring 94*a*.

The configuration of the mounting base 91 is not limited by the present invention specifically; it can be an integrally formed body as the present embodiment, an assembly of an upper and lower piece or can be in any other forms. The mounting base 91 is formed with a chamber 911, where the motor 92, transmission set 93 and spring 94 are installed, and the first extending tube 951 of the rear clutch member slides within. The shape of the first extending tube 951 should correspond to the shape of the chamber 911, so the first extending tube 951 can slide within the chamber 911. The shapes of the two are not limited. In order to ensure the first extending tube 951 slides in a certain direction, a sliding groove 952 is formed on the outer peripheral of the first extending tube 951, and a corresponding rib 912 is formed in the chamber 911. The sliding mechanism of the rear clutch member 95 and the chamber 911 is not limited to this embodiment, for example, the location of the rib and the sliding groove can be altered, or one can utilize rear clutch member 95 and chamber 911 with non-circular shape to limit the direction of sliding. The first extending tube 951 also has an engaging piece 953. The shape of the engaging piece 953 is also not specifically limited and can be adjusted according to the need of front clutch member or the shape of other corresponding components.

The motor 92 is axially connected to a transmission set 93. The transmission set 93 includes a worm gear 931*a*, which is axially connected to the rotating shaft 921. The worm gear 931*a* can be disposed on the rotating shaft 921 directly, or can also be connected in the configuration of the present embodiment. In the second embodiment, a connecting groove 9315 is formed first on the worm gear 921, and the rotating shaft 921 is axially connected to a connecting member 932, which is disposed in the connecting groove 9315 (please refer to FIG. 3). A bearing (not visible) is further installed on the rotating shaft 921 between the worm gear 931*a* and the motor 92. When the spring 94 abuts and pushes the rear clutch member 95, it generates a pushing force in the opposite direction against the worm gear 931*a*. The bearing serves as a cushion to reduce the pushing force, thereby reducing the rotation resistance generated in the worm gear 931*a* and prolonging the usage life of the transmission set 93. A tooth 9311 is formed on the worm gear 931*a*, but the tooth does not extend to the pushing end 9312 and the restoring end 9313.

The spring 94*a* includes an engagement part 941*a* and an abutment part 942*a*, located on two opposite ends of the spring 94*a*. In the second embodiment, the engagement part 941*a* is bent toward the worm gear 931*a* to form a horizontal hook to engage with the tooth 9311. The engagement part 941*a* is located between the outer diameter and the inner diameter of the tooth 9311 after bending, so the engagement part 941*a* abuts against the tooth 9311. When the tooth 9311 spirally rotates, the engaged engagement part 941*a* is also spirally rotated, and the spring 94*a* is moved forward along with the spiral rotation. In the second embodiment, the length of the bending part of the engagement part 941*a* is close to but not limited to the inner diameter of the spring 94*a*. The length of the bending part of the engagement part 941*a* can also be adjusted according to the outer diameter of the worm gear 931*a*. During the adjustment, a length with the largest contact area at the engagement, or other lengths shorter or longer than the previously described length can be used; however, the shortest length used should at least be able to engage part of the tooth 9311. In addition, the bending angle of the engagement part 941*a* can be vertical to the rotating shaft 921, or can also be the same as the lead angle formed in the direction vertical to the rotating shaft 921 in correspondence to the helical line of the tooth 9311.

On the other hand, the abutment part 942*a* in the second embodiment is a spring with a single diameter. However, the abutment part 942*a* is not limited to such configuration. The abutment part 942*a* can also be formed as a spiral configuration, where the diameter gradually increases from the end of the engagement part 941 to the abutment part 942*a*. Other forms of the abutment part 942*a* are also acceptable, as long as the inner diameter thereof is larger than the outer diameter of the tooth 9311. Nevertheless, the outer diameter of the abutment part 942*a* should still be smaller than the capacity of the first extending tube 951. The spring 94*a* can be either right-hand coiled or left hand coiled. The end of the abutment part 942*a* can be directly connected to the first extending tube 951, or can further be bent toward the axle to form a fixing part 943*a* for engaging the first extending tube 951. The configuration of the fixing part 943*a* is not limited by the present invention. The fixing part 943*a* can be a straight line, an arc line or can have a circular shape.

When assembling the present invention according to the second embodiment, the transmission set 93 is axially connected to the motor 92 first, similar to the first embodiment. Next, the spring 94*a* is engaged with the worm gear 931, and is capped to connect with the rear clutch member 95. Finally, the assembly is installed in the chamber 911 of the mounting base 91. The motor 92 is electrically connected with a circuit 96 for activating the power source and controlling it to rotate after sensing. The actuating method according to the second embodiment is similar to the first embodiment. The main difference lies in that the object being pushed by the tooth 9311, which is the abutment part 941*a*, is bent as a horizontal hook in the second embodiment.

Figure 10:
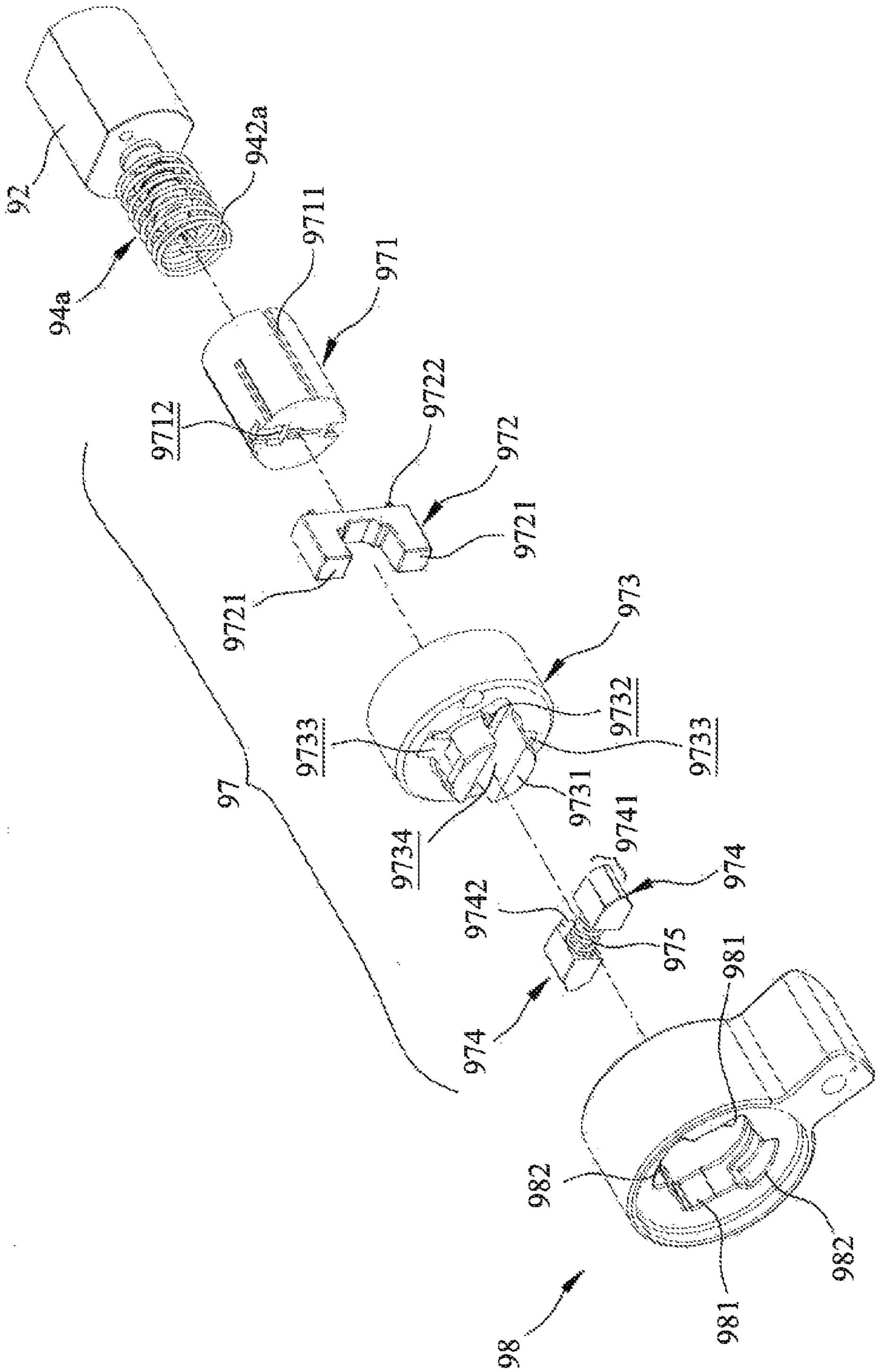
FIG. 10 is an exploded view showing the rear clutch member according to the third embodiment of the present invention.
Figure 11:
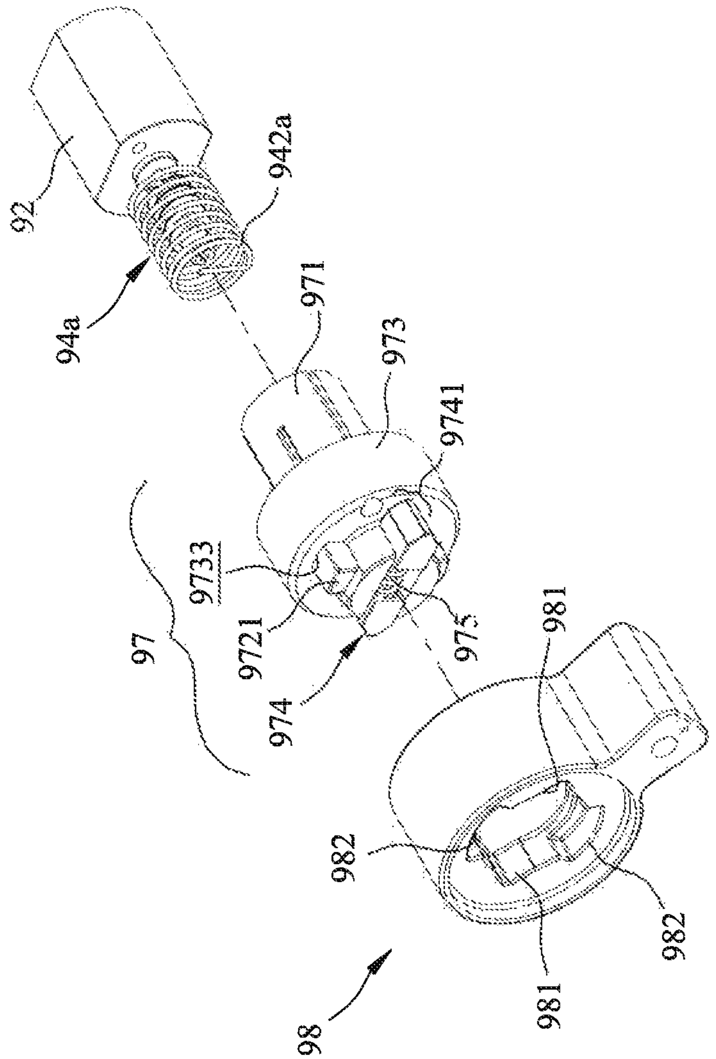
FIG. 11 is an assembly view showing the rear clutch member according to the third embodiment of the present invention.

FIG. 10 and FIG. 11 are exploded and assembly views showing the rear clutch member according to the third embodiment. The rear clutch member 97 of the present invention according to the third embodiment is coupled to a cam 98, which includes two positioning grooves 981 and two latching grooves 982. The rear clutch member 97 includes a second extending tube 971, a clutch block 972, a base 973, two positioning sliders 974 and a resilient member 975. The two positioning sliders 974 are connected with the resilient member 975 first before they are installed in the base 973. The clutch block 972 is connected to the second extending tube 971.

The shape of the second extending tube 971 corresponds to the shape of the chamber 911, so the second extending tube 971 can slide within the chamber 911. The shapes of the two are not limited. In order to let the second extending tube 971 slide in a certain direction, at least one sliding groove is disposed on the outer periphery of the second extending tube 971, and corresponding ribs 912 are disposed in the chamber 911 (refer to FIG. 3). The sliding mechanism described previously is not limited by the third embodiment. For example, the position of the ribs and the sliding groove can be altered, or other corresponding structures that do not have a cylindrical shape can be used. The end of the second extending tube 971 that abuts the abutment part 942 or 942*a* includes two mounting holes 9721 for connecting the fixing part 9722 on the clutch block 972.

The clutch block 972 according to the third embodiment includes two latching protrusions 9721. However, the number of the latching protrusions 9721 is not limited thereto. Configuration with one, three or four latching protrusions 9721 can also be used. Preferably, the positions of the latching protrusions 9721 are symmetrical about the circumference.

The base 973 according to the third embodiment includes two through holes 9733 and two restriction portions 9731. A buffer space 9734 is formed between the two restriction portions 9731, and the two through holes are disposed on the left and right side of the buffer space 9734 respectively. The latching protrusions 9721 of the clutch block 972 respectively protrude outward from the corresponding through holes 9733 after being abutted by the abutment part 942 or 942*a*. Therefore, the number and the shapes of the through holes 9733 are not limited in the third embodiment, where they can be configured corresponding to the latching protrusions 9721. Nevertheless, the position of the through holes 9733 should be outside of the buffer space 9734.

The resilient member 975 is connected between the two positioning sliders 974. In the third embodiment, the resilient member 975 is a spring, but it can also be other resilient elements. After the resilient member 975 is connected to the two positioning sliders 974, the assembly of the three is then installed in the buffer space 9734 of the base 973. The resilience of the resilient member 975 serves as a cushion for the positioning sliders 974 to slide toward each other, or it can also push the positioning sliders 974 to slide away from each other. Each positioning sliders 974 has a guiding protrusion 9742 installed correspondingly to sliding hole 9732 on the base 973, so the positioning sliders 974 can slide within the base 973. A positioning portion 9741 is formed on the outer periphery of each positioning sliders 974 for coupling with the positioning groove 981. In the third embodiment, the positioning portion 9741 is formed with two adjacent flat surfaces as a roof-shaped structure. Therefore, the positioning groove 981 should be a concave surface with a corresponding shape to the positioning portion 9741. The positioning portion 9741 can also have an arc shape (not shown), and the positioning groove 981 can also be a concave surface with a corresponding arc shape.

Figure 12:
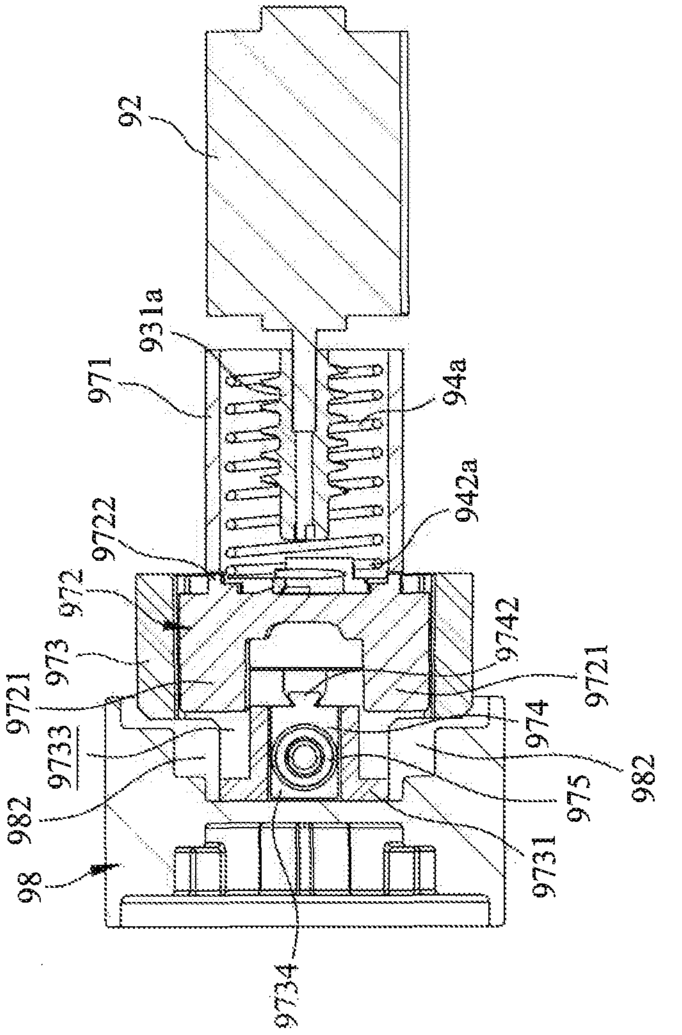
FIG. 12 is a side view showing the rear clutch member according to the third embodiment of the present invention.
Figure 13:
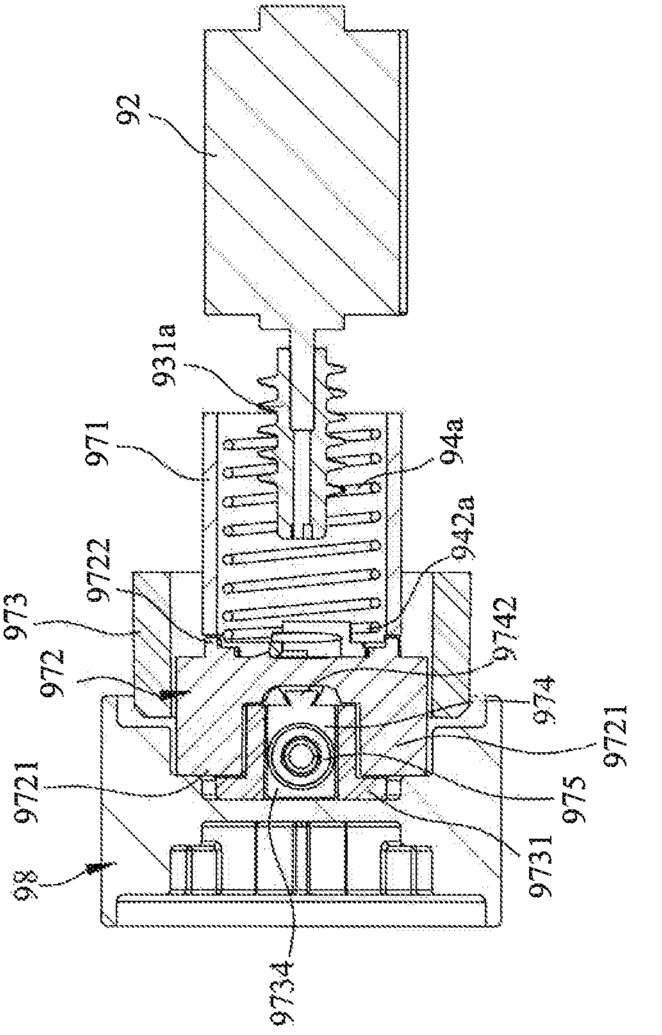
FIG. 13 is a schematic view showing the actuation of the rear clutch member according to the third embodiment of the present invention.

FIG. 12 is a side view of the rear clutch member 97 according to the third embodiment. FIG. 13 is a schematic view showing the actuation of the rear clutch member 97 according to the third embodiment. In the initial state (please refer to FIG. 11), the two positioning sliders 974 of the rear clutch member 97 are pushed away from each other by the resilience of the resilient member 975, so that the positioning sliders 974 are abutted and coupled with the positioning groove 981 respectively. When the base 973 is rotated, the two positioning sliders 974 are pushed by the positioning groove 981, and the two positioning sliders 974 are pushed inward to slide toward each other due to the resilience of the resilient member 975 as a cushion. As the result, two positioning sliders 974 are disengaged with the positioning grooves 981, and the cam 98 does not rotate along with the rotation of the base 973. However, when the motor 92 is activated and the abutment part 942*a* of the spring is moved, the second extending tube 971 is also pushed to move toward the direction of the base 973. Meanwhile, the latching protrusions 9721 of clutch block 972 connected with the second extending tube 971 gradually protrude outward from the through holes 9733 of the base 973 to a certain position, and further latch with the latching grooves 982 of the cam 98. Therefore, under this condition, the cam 98 is rotated along with the rotation of the base via the latching protrusions 9721, thereby opening the lock.

The preferred embodiments described above are disclosed for illustrative purpose but to limit the modifications and variations of the present invention. Thus, any modifications and variations made without departing from the spirit and scope of the invention should still be covered by the scope of this invention as disclosed in the accompanying claims.

What is claimed is:

1. An actuating motor set of an electronic lock, comprising:
- a mounting base formed with a chamber;
- a motor connected to said mounting base and having a rotating shaft;
- a transmission set having a worm gear connected to said rotating shaft, said worm gear having a tooth distributed not all the way to two opposite ends respectively defining a pushing end and a restoring end; and
- a spring including an engagement part engaging with said tooth and a remaining part defining an abutment part, an inner diameter of said abutment part being larger than an outer diameter of said tooth; wherein, said spring is pushed spirally by said tooth upon rotation of said worm gear, and thus moving back and forth in an axial direction of said worm gear, said spring being idle when it is moved to said pushing end of said worm gear due to lack of engagement therewith, and said spring being idle when it is moved said restoring end of said worm gear due to lack of engagement therewith.

2. The actuating motor set as claimed in claim 1, wherein said engagement part is an open spiral structure, and is engaged with said tooth in a spiral engagement method.

3. The actuating motor set as claimed in claim 2, wherein said abutment part further abuts a rear clutch member, said rear clutch member is installed and is slidable in said chamber.

4. The actuating motor set as claimed in claim 3, wherein said rear clutch member includes at least one sliding groove, and said chamber includes at least one corresponding rib.

5. The actuating motor set as claimed in claim 3, wherein said rear clutch member includes a first extending tube and an engaging piece connected therewith, and said first extending tube abuts against said abutment part.

6. The actuating motor set as claimed in claim 3, wherein said rear clutch member is further coupled to a cam, and said rear clutch member comprises:
- a base including two through holes and two restricting portions, wherein a buffer space is formed between said two restricting portions;
- two positioning sliders, each formed with a positioning portion on the outer periphery thereof, having a resilient member connected therebetween, wherein said two positioning sliders are fitted in said buffer space such that said two positioning sliders can slide toward or away from each other via the resilience of said resilient member in said buffer space;
- a second extending tube abutting against said abutment part; and
- a clutch block connected to the other end of said second extending tube opposite from said abutment part, wherein said clutch block includes at least one latching protrusion which abuts said second extending tube at said abutment part and protrudes from respective said through hole; wherein,
- said cam includes two positioning grooves for coupling with said positioning portion of said positioning slider, and includes at least one latching groove for latching with said at least one latching protrusion.

7. The actuating motor set as claimed in claim 6, wherein said positioning portion is formed by two adjacent flat surfaces as a roof-shaped structure, and said positioning groove is a concave surface with a corresponding shape to said roof-shaped structure of said positioning portion.

8. The actuating motor set as claimed in claim 6, wherein said positioning portion has an arc shape, and said positioning groove is a concave surface with a corresponding shape to said arc shape of said positioning portion.

9. The actuating motor set as claimed in claim 2, wherein said worm gear further forms a connecting groove, said connecting groove receives and connects with a connecting member which is connected to said rotating shaft.

10. The actuating motor set as claimed in claim 2, wherein said worm gear is further connected with a base, said base is used to abut against said engagement part of said spring.

11. The actuating motor set as claimed in claim 1, wherein said engaging part is bent toward said worm gear to form a horizontal hook, so as to engage with said tooth.

12. The actuating motor set as claimed in claim 11, wherein said abutment part further abuts a rear clutch member, said rear clutch member is installed and is slidable in said chamber.

13. The actuating motor set as claimed in claim 12, wherein said rear clutch member includes at least one sliding groove, and said chamber includes at least one corresponding rib.

14. The actuating motor set as claimed in claim 12, wherein said rear clutch member includes a first extending tube and an engaging piece connected therewith, and said first extending tube abutting against said abutment part.

15. The actuating motor set as claimed in claim 12, wherein said rear clutch member is further coupled to a cam, said rear clutch member comprises:

a base including two through holes and two restricting portions, wherein a buffer space is formed between said two restricting portions;

two positioning sliders, each formed with a positioning portion on the outer periphery thereof, having a resilient member connected therebetween, wherein said two positioning sliders are fitted in said buffer space such that said two positioning sliders can slide toward or away from each other via the resilience of said resilient member in said buffer space;

a second extending tube abutting against said abutment part; and a clutch block connected to the other end of said second extending tube opposite from said abutment part, wherein said clutch block includes at least one latching protrusion which abuts said second extending tube at said abutment part and protrudes from respective said through hole; wherein, said cam includes two positioning grooves for coupling with said positioning portion of said positioning slider, and includes at least one latching groove for latching with said at least one latching protrusion.

16. The actuating motor set as claimed in claim 15, wherein said positioning portion is formed by two adjacent flat surfaces as a roof-shaped structure, and said positioning groove is a concave surface with a corresponding shape to said roof-shaped structure of said positioning portion.

17. The actuating motor set as claimed in claim 15, wherein said positioning portion has an arc shape, and said positioning groove is a concave surface with a corresponding shape to said arc shape of said positioning portion.

18. The actuating motor set as claimed in claim 11, wherein said worm gear further forms a connecting groove, said connecting groove receiving and connecting with a connecting member which is connected to said rotating shaft.

19. The actuating motor set as claimed in claim 11, wherein said worm gear is further connected with a base, which abuts against said engagement part of said spring.

* * * * *